US009424252B2

(12) United States Patent
Takaoka et al.

(10) Patent No.: US 9,424,252 B2
(45) Date of Patent: Aug. 23, 2016

(54) INFORMATION PROVIDING DEVICE, INFORMATION PROVIDING METHOD, AND COMPUTER PROGRAM

(75) Inventors: Kenji Takaoka, Osaka (JP); Takao Yano, Chiba (JP); Masayasu Iwashima, Tokyo (JP); Kenichi Maeda, Tokyo (JP); Zhichen Geng, Tokyo (JP)

(73) Assignee: PIJIN CO. LTD., Tokyo (JP)

( * ) Notice: Subject to any disclaimer, the term of this patent is extended or adjusted under 35 U.S.C. 154(b) by 218 days.

(21) Appl. No.: 14/110,625

(22) PCT Filed: Apr. 2, 2012

(86) PCT No.: PCT/JP2012/058854
§ 371 (c)(1),
(2), (4) Date: Dec. 20, 2013

(87) PCT Pub. No.: WO2013/042390
PCT Pub. Date: Mar. 28, 2013

(65) Prior Publication Data
US 2014/0195218 A1    Jul. 10, 2014

(30) Foreign Application Priority Data

Sep. 20, 2011 (JP) .................................. 2011-205270

(51) Int. Cl.
*G10L 15/00* (2013.01)
*G06F 17/28* (2006.01)
(Continued)

(52) U.S. Cl.
CPC ............. *G06F 17/28* (2013.01); *G06F 17/289* (2013.01); *G06F 17/2836* (2013.01);
(Continued)

(58) Field of Classification Search
CPC ... G06F 17/289; G06F 17/28; G06F 17/2827; G06F 17/2836; G06F 17/2872; G06F 17/30011; G06F 17/30705; G06F 17/30702; G06F 11/3612; G06F 17/2705; G06F 17/2785; G06F 17/30038; G06F 17/30058; G06F 17/30516; G06F 17/30625; G06F 17/3069; G06F 17/30669; G06F 17/30017; G06F 17/3043

USPC ............. 704/1–10, 251, 250, 255, 257, 277, 704/270, 270.1
See application file for complete search history.

(56) References Cited

U.S. PATENT DOCUMENTS 5,848,426 A    12/1998  Wang
6,370,498 B1 *  4/2002  Flores .................. G06F 17/2827
                                                704/3

(Continued)

FOREIGN PATENT DOCUMENTS

CN           1719458 A    1/2006
CN         101526937 A    9/2009
(Continued)

OTHER PUBLICATIONS

European Search Report for corresponding application EP 12833954.6, dated Sep. 2, 2015.
(Continued)

*Primary Examiner* — Huyen Vo
(74) *Attorney, Agent, or Firm* — Matthew B. Dernier, Esq.

(57) ABSTRACT

An information providing device: saves a posted document and respective electronic files of a translation thereof in one or more other languages, in association with one another; issues a code image including a two-dimensional code created by encoding a two-dimensional code character string for identifying the electronic file associated with the same identification information; receives, from a user terminal device that accesses the electronic file by decoding the two-dimensional code from the document on which the code image is printed, character code data indicating the language set in the user terminal device, and transmits the electronic file of the translation translated into the language indicated by the character code data to the user terminal device together with information that indicates the posting place of the document, thereby providing the translation and the information that indicates the posting place of the document.

10 Claims, 14 Drawing Sheets

(51) Int. Cl.
  *G06Q 10/10* (2012.01)
  *G06Q 30/02* (2012.01)
  *G06F 17/30* (2006.01)

(52) U.S. Cl.
  CPC ... *G06F 17/30011* (2013.01); *G06F 17/30876* (2013.01); *G06F 17/30887* (2013.01); *G06Q 10/10* (2013.01); *G06Q 30/02* (2013.01)

(56) References Cited

U.S. PATENT DOCUMENTS

| | | | |
|---|---|---|---|
| 7,536,649 | B2 | 5/2009 | Hasegawa |
| 7,706,904 | B2 | 4/2010 | Jones |
| 8,204,735 | B2 | 6/2012 | Kamatani |
| 2005/0246156 | A1* | 11/2005 | Scanlan ............... G06F 17/289 704/2 |
| 2007/0022114 | A1 | 1/2007 | Hasegawa |
| 2008/0140382 | A1 | 6/2008 | Jones |
| 2009/0125497 | A1* | 5/2009 | Jiang ................ G06F 17/30669 |
| 2009/0228263 | A1 | 9/2009 | Kamatani |
| 2010/0030549 | A1* | 2/2010 | Lee ..................... G06F 1/1626 704/4 |
| 2010/0057434 | A1* | 3/2010 | Konno ................ G06F 17/289 704/3 |
| 2010/0072269 | A1 | 3/2010 | Scott |

FOREIGN PATENT DOCUMENTS

| | | |
|---|---|---|
| CN | 101611436 A | 12/2009 |
| CN | 102184171 A | 9/2011 |
| JP | 2001338169 A | 12/2001 |
| JP | 2006048476 A | 2/2006 |
| JP | 2006244252 A | 9/2006 |
| JP | 2007025980 A | 2/2007 |
| JP | 2008181504 A | 8/2008 |
| JP | 2009157894 A | 7/2009 |
| WO | 0237327 A2 | 5/2002 |
| WO | 2009079407 A2 | 6/2009 |

OTHER PUBLICATIONS

International Search Report for corresponding application PCT/JP2012/058854, dated Jun. 26, 2012.

NFC Keitai to NFC Tag 0 Mochiita Ginza Denshi Poster Jikken, TRONWARE, Jun. 20, 2011, vol. 22, No. 3, 4 pages total inclusive of pp. 30-31 (For relevancy, see International Search Report, dated Jun. 26, 2012).

Office Action for corresponding Chinese application CN 201280045122.1, dated Dec. 2, 2015.

Office Action for corresponding Chinese application CN 201280045122.1, 3 pages, dated May 27, 2016.

* cited by examiner

| DOCUMENT IDENTIFICATION INFORMATION | 0001 | 0002 | 0003 | **** |
|---|---|---|---|---|
| TWO-DIMENSIONAL CODE CHARACTER STRING | 12322246 | 22222222 | 33333333 | ******** |
| DOCUMENT POSTING PERIOD | 2011/07/20 2011/08/31 | 2011/08/01 2011/09/30 | YEAR ROUND | |
| DOCUMENT SITUATION | NOTICE TO CITIZENS | EVENT INFORMATION | TOURIST INFORMATION | |
| DOCUMENT POSTING PLACE | ○○ CITY HALL | ○○ MALL | ○○ TEMPLE | |
| CREATED DATE | 2011/06/20 | **// | //** | |
| TRANSLATION COMPLETION DATE | 2011/06/25 | **// | //** | |
| COST | 7350 | **** | **** | |
| JPN | ○ | × | ○ | |
| ENG | ○ | ○ | ○ | |
| CHN | × | × | ○ | |

| MENU | | | | | | |
|---|---|---|---|---|---|---|
| CLIENT INFORMATION<br>CLIENT NAME : ○○ CITY GOVERNMENT<br>ADDRESS : ○○ CITY ○○ TOWN ○-○-○○<br>CONTRACT PERIOD : APRIL 2011－MARCH 2012 | | | | MAP<br>INFORMATION | DOCUMENT<br>UPLOAD | |
| | CREATED<br>DATE | TRANSLATION<br>COMPLETION<br>DATE | POSTING<br>PERIOD | LANGUAGE | COST | CODE |
| Text1 | 6/20/11 | 6/25/11 | 2011/05/01<br>2011/05/31 | ENGLISH,<br>CHINESE,<br>KOREAN | 7350 | DOWNLOAD |
| Text2 | | | | | | |
| Text3 | | | | | | |
| Text4 | | | | | | |
| Text5 | | | | | | |

FIG. 7

DOCUMENT INPUT

TEXT INPUT

FILE STORAGE LOCATION

FIG. 8

SITUATION INPUT

FIG. 9

POSTING PLACE INPUT

FIG. 10

TRANSLATION LANGUAGE SELECTION

☐ Arabic           ☐ Chinese
☐ Danish           ☐ Dutch
☐ English          ☐ Finish
☐ French           ☐ German
☐ Hebrew           ☐ Italian
☐ Japanese         ☐ Korean
☐ Norwegian        ☐ Russian
☐ Sami, Nothern    ☐ Spanish

FIG. 11

POSTING PERIOD · TRANSLATION TOOL

POSTING PERIOD [ ] YEAR [ ] MONTH [ ] DAY

→ [ ] YEAR [ ] MONTH [ ] DAY

TRANSLATION TOOL

☐ CROWDSOURCING HUMAN TRANSLATION

☐ MACHINE TRANSLATION

FIG. 12

TEXT

POSTING SITUATION

TRANSLATION LANGUAGE
☐ ENGLISH
☐ CHINESE
☐ KOREAN
☐ PORTUGUESE
☐ SPANISH
☐ FRENCH
☐ GERMAN
☐ OTHERS

POSTING PERIOD

2011/08/01 ⇒ 2011/09/30

POSTING PLACE

MAP | ADDRESS/PHONE NUMBER, OR THE LINK

FIG. 13

INFORMATION PROVIDING DEVICE, INFORMATION PROVIDING METHOD, AND COMPUTER PROGRAM

TECHNICAL FIELD

The present invention relates to an information providing device, an information providing method, and a computer program, which provide a translation of a posted material, such as a document posted in a public place, in various languages.

BACKGROUND ART

Some documents posted in a public place or the like have a role of providing information to visitors in addition to providing information to nearby residents. Documents posted in Japan are usually written in Japanese and people who do not comprehend Japanese cannot obtain information from the documents. Sign boards in tourist sites or the like are sometimes written in English alongside Japanese, but not all comprehend English. Writing in every language would be ideal but is not practical due to the issues of posting space and translation cost.

A possible solution has been proposed in which a two-dimensional code is printed on a posted document and a translation of the document is provided with the use of a cellular phone or other information terminal devices that have a function of decoding two-dimensional codes. Patent Literature 1, for example, describes an idea of displaying a two-dimensional code in a document and using the two-dimensional code to obtain a document that is a translation of the displayed document from the Internet in the form of texts or voice. The translation is in a plurality of languages from which a user can choose. However, Patent Literature 1 does not disclose concrete means for realizing the idea.

Patent Literature 2 describes an invention in which text information written in a document is translated into another language as translated text information, which is turned into two-dimensional code information to be displayed as a two-dimensional code alongside the document, and the two-dimensional code is converted into the translated text information and reproduced as voice information by a cellular phone.

Patent Literature 3 discloses an invention in which a two-dimensional code for accessing an electronic document that is stored in an external server is printed in a paper document, and an information specifying device accesses the electronic document with the use of the two-dimensional code, and specifies word information from the electronic document. In this invention, the information specifying device asks an external translation sever to execute processing of translating one sentence that includes the specified word, thereby making a translation, and the result of the translation is displayed on the information specifying device.

CITATION LIST

Patent Literature

[PTL 1] JP 2009-157894 A
[PTL 2] JP 2006-48476 A
[PTL 3] JP 2007-25980 A

SUMMARY OF INVENTION

Technical Problem

In Patent Literatures 2 and 3, the translation of a phrase or an individual sentence is available, but the translation of lengthy writing is not suited, such as the whole document including a plurality of sentences. In addition, there is no verification that the translation really corresponds to the posted document in question, and users of the translation are left with the doubt about whether accurate information is being provided.

Thus, no concrete device or system has been hitherto realized that translates the entire content of a document in various languages and provides the translation accurately to users.

In order to solve this problem, a main object of the present invention is to provide a technology capable of providing the content of a document accurately to users in various languages.

Solution to Problem

In order to solve the above-mentioned problem, according to one embodiment of the present invention, there is provided an information providing device including: document saving means for saving a document that is posted in a given posting place and respective electronic files of a translation of the document in one or more other languages, in association with the same identification information; recording means for recording a character string for identifying each of the electronic files and location information for allowing visual recognition of the given posting place of the document; code image issuing means for issuing a code image including a character string image obtained by encoding the character string; and control means for receiving character code data indicating a particular language from a terminal device, which accesses the relevant electronic file by decoding the character string from the document where the code image is printed or attached and which includes a display device, for extracting from the document saving means the electronic file of the translation in the particular language that is indicated by the character code data, for extracting from the recording means the location information that indicates the given posting place of an original document of the translation, and for transmitting the extracted electronic file and the extracted location information to the terminal device so that the extracted electronic file and the extracted location information are displayed on the display device.

The content of the electronic file that is created by computerizing the translation in the language indicated by the character code data is displayed on the terminal device, thereby enabling an operator of the terminal device to check the content of the posted document in a desired language. The translation is saved on the information providing device, and the whole document can therefore be included as the target of translation irrespective of the volume of the original document. In addition, the location information of where the original document is posted can be recognized visually, which enables the operator to confirm that the content of the electronic file being displayed is a translation of the original posted document from the relation between a place where the terminal device is operated and the location of the posted document. In other words, if a location obtained by the terminal device decoding a character string on the document is the same as a location indicated by the posting place information, the translation is guaranteed to be a translation of the original document.

The document saving means may save image data of the document in association with identification information of the document. The information providing device may further include translation document generating means for detecting a layout of the original document prior to translation, and for editing the translation in the particular language indicated by the character code data to give the electronic file of the translation the same layout, and a content of the electronic file may be transmitted to the terminal device. With this configuration, the translation document has the same layout as that of the document posted in the posting place, and the operator of the terminal device can confirm that the translation document is a translation of the original document by comparing the posted document and the translation document.

More specifically, the code image issuing means generates the code image by combining the character string image with encoded language images, which indicate languages into which the document associated with the electronic file that is identified by the character string is translated, and one of the encoded language images is selected so that the electronic file of the translation in the language of the selected one of the encoded language images is selectable.

The information providing device may further include: an interface for connecting to crowdsourcing human translation; and quotation processing means for executing processing of quoting cost of translating the posted document in a list of translation languages by the crowdsourcing human translation.

According to one embodiment of the present invention, there is provided an information providing method, which is to be executed by an information providing device accessed by a terminal device that includes a display device, the information providing method including: saving a document that is posted in a given posting place and respective electronic files of a translation of the document in one or more other languages in a document saving area, in association with the same identification information, and recording, in a given memory area, a character string for identifying each of the electronic files and location information for allowing visual recognition of the given posting place of the document; and transmitting, to an issuer of the document, a code image including a character string image obtained by encoding the character string, receiving character code data indicating a particular language from the terminal device, which accesses the relevant electronic file by decoding the character string from the document where the code image is printed or attached by the issuer, extracting from the document saving area the electronic file of the translation in the particular language that is indicated by the character code data, extracting from the given memory area the location information that indicates the given posting place of an original document of the translation, and transmitting the extracted electronic file and the extracted location information to the terminal device so that the extracted electronic file and the extracted location information are displayed on the display device.

According to one embodiment of the present invention, there is provided a computer program for causing a computer to function as an information providing device, the computer including: document saving means for saving a document that is posted in a given posting place and respective electronic files of a translation of the document in one or more other languages, in association with the same identification information; and recording means for recording a character string for identifying each of the electronic files and location information for allowing visual recognition of the given posting place of the document, the computer program causing the computer to function as: code image issuing means for issuing a code image including a character string image obtained by encoding the character string; and control means for receiving character code data indicating a particular language from a terminal device, which accesses the relevant electronic file by decoding the character string from the document where the code image is printed or attached and which includes a display device, for extracting from the document saving means the electronic file of the translation in the particular language that is indicated by the character code data, for extracting from the recording means the location information that indicates the given posting place of an original document of the translation, and for transmitting the extracted electronic file and the extracted location information to the terminal device so that the extracted electronic file and the extracted location information are displayed on the display device.

Advantageous Effects of Invention

In the present invention, where the posted document and the electronic files of the translation of the posted document are saved by the document saving means to be provided, the translation of the entire content of the document can be provided to users in various languages. In addition, the location information about where the original document is posted is displayed visually along with the translation, which means that, if the posting place information indicates the correct location, the translation is guaranteed to be genuinely the translation of the original document and not of another document.

BRIEF DESCRIPTION OF DRAWINGS

FIG. 7 is a diagram illustrating what is displayed on a client terminal device after login.

FIG. 8 is a diagram exemplifying a document inputting screen.

FIG. 9 is a diagram exemplifying a posting situation inputting screen.

FIG. 10 is a diagram exemplifying a posting place inputting screen.

FIG. 11 is a diagram exemplifying a screen for selecting a translation language.

FIG. 12 is a diagram exemplifying a screen for selecting a posting period and a translation tool.

FIG. 13 is a diagram illustrating what is displayed on the client terminal device when a document is uploaded.

DESCRIPTION OF EMBODIMENT

An embodiment of the present invention is described in detail below with reference to the drawings.

Figure 1:
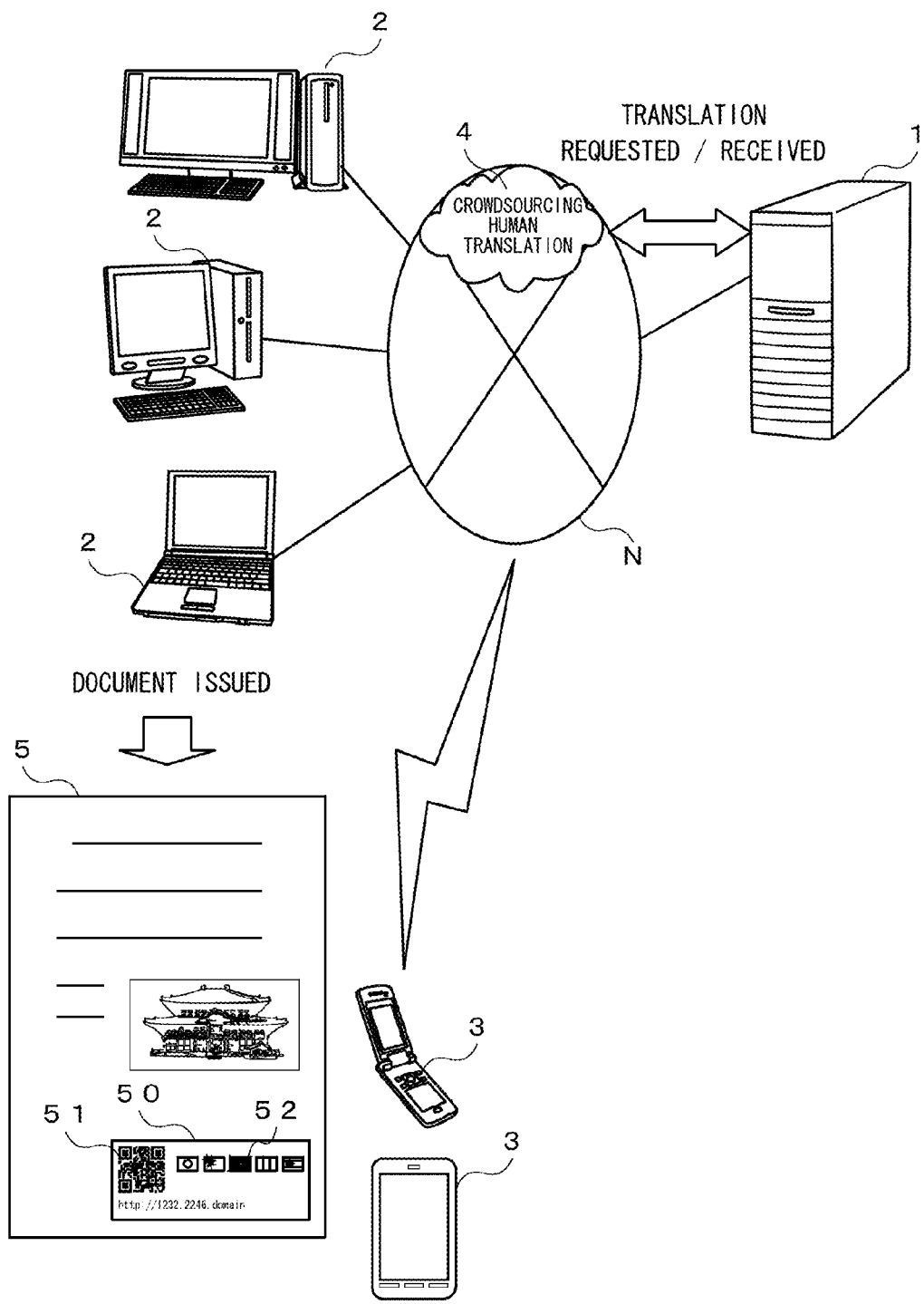
FIG. 1 is an overall configuration diagram of an information providing system including an information providing device.

FIG. 1 is an overall configuration diagram of an information providing system including an information providing device of the present invention.

This information providing system includes an information providing device 1 connected so as to be capable of two-way data transmission/reception over a network N (for example, the Internet), a client terminal device 2, which is provided at each of a plurality of clients who request a translation of a posted document, and a user terminal device 3, which is owned by a user who uses the translation.

The information providing device 1 is implemented by cooperation between a server that has a communication function and a computer program of the present invention. At the request of the client terminal device 2, the information providing device 1 manages translation files which are electronic data of a translation into foreign languages of a document 5 written in Japanese.

This embodiment allows the use of crowdsourcing human translation 4 in the translation of the document 5. "crowdsourcing human translation" is a cloud-type, i.e., external information processing system that exists outside the own device for a translation service. Using the crowdsourcing human translation 4 is expected to keep the cost of translation low. Other than the crowdsourcing human translation 4, normal translation which is performed by a person may be used. Conventional machine translation may also be used. Machine translation reduces the cost even more than the crowdsourcing human translation 4. Machine translation is low in quality but has an advantage in that a translation document can be provided speedily. In the case of using machine translation, translation is performed, for example, by a general-purpose machine translation tool provided in the information providing device 1 or another information processing device capable of holding communication to/from the information providing device 1.

The information providing device 1 grants access from the user terminal device 3 and, in response to the access, provides the user terminal device 3 with a desired translation file (electronic file) in a viewable manner. When providing the translation file, the information providing device 1 issues a code image 50 which depicts a two-dimensional code 51 indicating a Uniform Resource Locator (URL) for accessing the translation file. The code image 50 is described later.

The client terminal device 2 is a computer machine that is operated by a client registered in the information providing device 1, and is capable of accessing the information providing device 1 via a general-purpose Web browser and the network N. The client operates the client terminal device 2 to upload a document file to the information providing device 1, and request processing of quoting the cost of translating the document 5 and the translation. The client terminal device 2 receives the code image 50 to be printed on the document 5 from the information providing device 1 in response to the translation request. The client issues the document 5 and posts the document 5 in a public place with the code image 50 printed on the document 5. Alternatively, the client uses the code image 50 by printing the code image 50 on a given sticker and sticking the sticker onto the document 5.

Used as the user terminal device 3 is a portable information terminal device that has a data communication function and a data processing function, such as a cellular phone or a smartphone. The user terminal device 3 has a camera function, and can access a translation file saved on the information providing device 1 by taking in and decoding the code image 50 printed on the document 5.

A detailed configuration of the information providing device 1 is described next with reference to FIG. 2.

The information providing device 1 has functions implemented by the computer program of the present invention. The functions include a client management unit 10 for managing registration information of a client, a document management unit 11 for managing translation files, a communication control unit 12 for performing data transmission/reception to/from external devices (the client terminal device 2, the user terminal device 3, the crowdsourcing human translation 4, and others), a code image issuing unit 13 for issuing the code image 50, a quotation processing unit 14 for executing processing of quoting translation cost, a translation document image generating unit 15 for generating an image of a translation document, a main control unit 16 for controlling the operation of the respective components of the information providing device 1, and a machine translation tool 17 for performing machine translation on a document. The information providing device 1 also builds in a storage device (not shown) a client database (hereinafter referred to as "client DB") 100 and a document database (hereinafter referred to as "document DB") 110.

The client management unit 10 assigns client identification information for identifying a client to information about the client (a client name, an address, a representative's name, a contract period, a login ID, a password, and the like) which is received from the client terminal device 2, and saves the information as registration information in the client DB 100 in a freely readable manner. The registration information includes a history of documents that the client has registered in the information providing device 1. For example, document identification information which is described later is recorded in the history. The client identification information may be the same as the login ID. The login ID and the password may be assigned at the discretion of the client management unit 10, or may be determined by the client on their own.

Figures 2, 3:
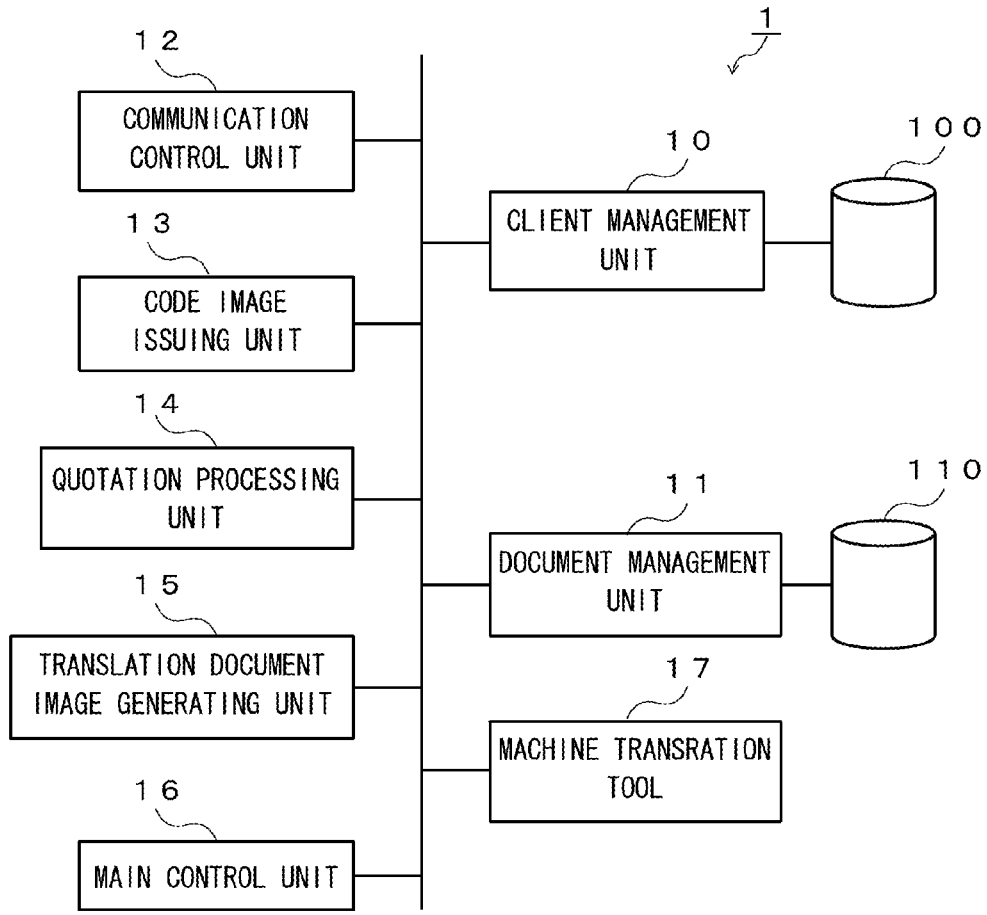
FIG. 2 is a configuration diagram of the information providing device.
FIG. 3 is a diagram exemplifying registration information.

FIG. 3 is a diagram exemplifying the registration information saved in the client DB 100. The registration information includes map information based on the address. Location information can thus be visualized.

The document management unit 11 assigns document identification information for identifying a document received from the client terminal device 2 to a document file which is electronic data of the document, and saves a translation file corresponding to the document file in association with the document identification information in the document DB 110 in a freely readable manner for a fixed period of time. In the case of a document that includes image data, the document management unit 11 obtains the image data from the client terminal device 2 and saves the image data in association with relevant document identification information. A document file and a translation file and image data of the document file can be identified by document identification information.

Figures 4, 5:
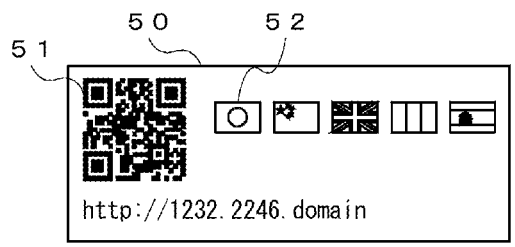
FIG. 4 is a diagram exemplifying a table.
FIG. 5 is a diagram exemplifying a code image.

The document management unit 11 has a document management table for managing a document file and a translation file that are saved in the document DB 110. FIG. 4 is a diagram exemplifying the document management table.

Recorded in the document management table are document identification information and a character string that is used to generate a two-dimensional code assigned in order to identify a document file in question (hereinafter referred to as "two-dimensional code character string"). A two-dimensional code character string is as signed to each piece of document identification information individually. Accordingly, a document file and a translation file corresponding to the document file are identified by the same two-dimensional code. The two-dimensional code character string also functions as a URL for accessing a desired translation file from the user terminal device 3. The document management unit 11 can therefore easily identify a translation file and image data that correspond to a document file by the two-dimensional code character string or document identification information of the document file.

Also recorded in the document management table for each document file is determination information for determining in which language the document file has been translated. In the illustrated example, "o" is written in the case where translation has been finished and "x" is written in the case where translation has not been finished yet. However, the determination information can take any mode that enables the document management unit 11 to discern.

Additionally recorded in the document management table are a document posting period, information that indicates a document posting situation, namely, for what purpose the document is posted and the like, a place where the document is posted, a document file registration date (created date), a translation completion date, translation cost, and the like. These can be referred to suitably in order to execute necessary processing.

The code image issuing unit 13 generates the two-dimensional code 51 which indicates a two-dimensional code character string (URL) of the document management table saved in the document DB 110, and generates a language code 52 indicating in which language the translation has been made as well. The code image issuing unit 13 also generates the code image 50 which includes the two-dimensional code 51 and the language code 52, and transmits the code image 50 to the client terminal device 2 via the communication control unit 12 and the network N.

FIG. 5 is a diagram exemplifying the code image 50 which is generated by the code image issuing unit 13.

The code image 50 is an image that includes as its contents the two-dimensional code 51 and the language code 52, which corresponds to each of a plurality of languages on a one-on-one basis. The two-dimensional code 51 can be, for example, the QR (trademark) code, Data Matrix (trademark), or Han Xin Code (trademark). Alternatively, a one-dimensional code or a character string encoded in another image may be used as the two-dimensional code 51. The language code 52 only needs to clarify in which country's language translation is made. Therefore, while the language code 52 is a national flag in the example of FIG. 5, a language name abbreviated according to International Organization for Standardization (ISO) or the like may be written as the language code 52. The language code 52 may also be displayed in color so that which country's language is indicated by the particular language code 52 is understood easily. The language code 52 is for allowing a user to access a translation file that is in the indicated language when selected by the user. As illustrated in FIG. 5, a URL indicated by the two-dimensional code character string may be displayed alongside the code. This enables the user to access the translation file by directly inputting the URL on the user terminal device 3. The code image 50 may display which of machine translation and translation by a person including crowdsourcing human translation has been performed. For instance, "MT" (an abbreviation for machine translation) may be displayed in the case of machine translation. The user can know the quality of a translation provided by knowing how the translation has been performed.

The quotation processing unit 14 executes processing of quoting translation cost when, for example, receiving a request for a translation of a document from the client terminal device 2. The quotation processing involves counting the number of characters of translation target sentences in the document with the use of a known character counting function and measuring the load of the crowdsourcing human translation 4 in a given period of time, and is based on the counting result, the measuring result, and a language-by-language unit-cost table (not shown) of the crowdsourcing human translation 4 which is recorded in advance. The result of the quotation processing is returned to the client terminal device 2 by the communication control unit 12 via the network N along with a quotation validity period.

The unit-cost table is weighted for each language with a weighting coefficient, which is updated as the need arises in relation to the load of the crowdsourcing human translation 4. The quotation validity period is, for example, a period during which crowdsourcing human translation is secured. When the load of the crowdsourcing human translation 4 is heavy or in the case of a language difficult to translate into, the weighting coefficient is large and the quote is accordingly high.

The translation document image generating unit 15 identifies the specifics of a request for a translation document from the user terminal device 3, and then creates (edits) a translation document that has the same layout as the original document except that the text document is translated by reading the corresponding translation file and necessary image data out of the document DB 110 via the document management unit 11.

The information providing device 1 can thus provide the user with a translation document that has the same layout as the original document that the user is currently viewing, and the user can confirm that the currently viewed original document is genuine.

The machine translation tool 17 translates the document 5 in the case where a client desires machine translation as the translation tool for the document 5, and sends the result of translation to the document management unit 11 as a translation file.

[Operation Mode Example]

An operation mode example of the information providing system configured as above is described next.

This information providing system is registration-based, and a premise thereof is that information about a client and client identification information are registered in advance in the client DB 100 of the information providing device 1.

<Document Registration and Translation>

Figure 6:
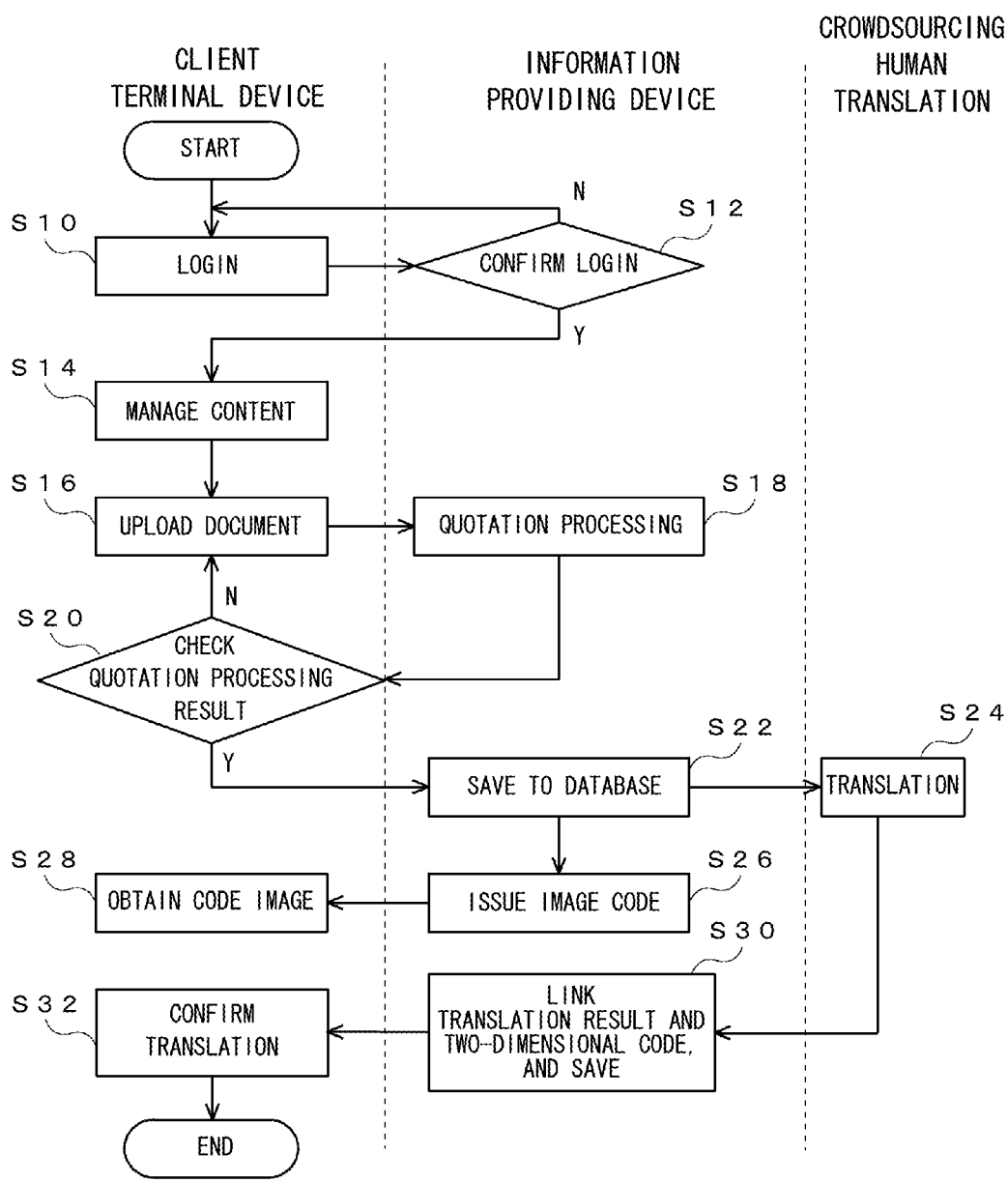
FIG. 6 is a procedure diagram of processing related to document registration and translation.

The information providing device 1 follows a procedure of FIG. 6 to perform document registration and translation services.

Specifically, when a login ID and password of a client are input to the information providing device 1 from the client terminal device 2 via the network N (Step S10), the information providing device 1 determines whether or not the input login ID and password have been registered by searching the client DB 100 with the client management unit 10. In the case where the information is registered information, the information providing device 1 authenticates the logging in of the client (Step S12: Y). In the case where the input information has not been registered, the information providing device 1 notifies the client terminal device 2 of the need to input a login ID and a password anew (Step S12: N).

After the login is completed successfully, the client terminal device 2 displays a list of documents that the client has registered in the information providing device 1 up to that point, along with information of the client (Step S14). FIG. 7 is a diagram exemplifying this display.

Upon login, registration information of the client is identified from among the client DB 100, and a history of registered documents is read out of the identified registration information of the client. Document identification information of a document registered by the client is thus identified. The identified document identification information is used to search the document DB 100 and identify information about the document. The exemplary diagram of FIG. 7 reflects data of the client DB 100 and data of the document DB 110 that have been identified in this manner.

The client uploads the document 5 to be registered through this screen (Step S16). By selecting "document upload" on the screen, the client causes the client terminal device 2 to display a screen for guiding the uploading of the document 5. The client operates the screen following the guidance, to thereby input the text of the document 5, the posting situation of the document 5, the posting place of the document 5, the posting period of the document 5, a tool to be used for translation (crowdsourcing human translation, machine translation, or the like), and a language into which the document 5 is translated among others. FIGS. 8 to 12 are diagrams exemplifying screens that are displayed when the document 5 is uploaded. The screens of FIGS. 8 to 12 are sequentially displayed on the client terminal device 2 with the progress of document upload. FIG. 8 is a diagram exemplifying a screen for inputting the document 5. The text is input by direct input to a text input field of FIG. 8, or by uploading a text file, or a file created with document creation software such as word processor software or the like, to a file storage location field. FIG. 9 is a diagram exemplifying a posting situation inputting screen. The posting situation is input by inputting text directly to a field of FIG. 9. FIG. 10 is a diagram exemplifying a posting place inputting screen. The posting place is input by specifying a posting place on a map of FIG. 10 through clicking or the like. In the case where the address or the longitude and the latitude are known, these may be input directly. FIG. 11 is a diagram exemplifying a screen for selecting a language in which a translation is made. The translation language is input by selecting a desired language on the screen of FIG. 11. FIG. 12 is a diagram exemplifying a screen for selecting a posting period and a translation tool. The translation period can be input directly or via a pull-down menu on the screen of FIG. 12. The translation tool can be selected on the screen of FIG. 12. In the case of crowdsourcing human translation, a cost per word, for example, may be displayed as a guide for a translation fee. The result of these inputs is as illustrated in FIG. 13, for example.

After checking the screen of FIG. 13, the client operates the client terminal device 2 to upload the document to the information providing device 1. Image data of the document 5 can be uploaded simultaneously.

The information providing device 1 uses the quotation processing unit 14 to count the number of characters in the text of the document 5 that has been uploaded, measures the load of the crowdsourcing human translation 4, and executes processing of quoting the cost of translation based on the language in which the translation is made, the number of characters to be translated, the result of measuring the load, and the unit-cost table (Step S18). The result of the quotation processing is notified to and displayed on the client terminal device 2. The client checks the quotation processing result displayed on the client terminal device 2 and, if agreeable to the quote, notifies the information providing device 1 to that effect (Step S20: Y). The client may be led to a screen for settlement at this point. In the case of machine translation, the quotation processing of Step S18 is not necessary and Steps S18 and S20 can therefore be omitted.

In the case where the quote is not agreeable to the client, the client returns to the screen of FIG. 13 to change translation conditions or the like and request re-quotation (Step S20: N).

When receiving the notification of agreement to the quotation processing result, the information providing device 1 saves the text of the uploaded document in the document DB 110 as a document file (Step S22). The information providing device 1 also requests the crowdsourcing human translation 4 to translate the document (Step S24).

After saving the document file, the information providing device 1 uses the code image issuing unit 13 to generate the two-dimensional code 51 and the language code from a two-dimensional code character string of the document and the language requested to be used in the translation, and to issue the code image 50 that includes these codes (Step S26). The client terminal device 2 obtains the issued code image (Step S28).

The client prints the obtained code image on the document 5, or prints the code image on a given sticker to be stuck onto the document 5, and then posts the document 5 in the posting place.

A translation performed by the crowdsourcing human translation 4 is sent to the information providing device 1. The information providing device 1 links this translation to the two-dimensional code character string assigned to the original document of the translation, and saves the translation in the document DB 110 as a translation file (Step S30). The content of the saved translation file can be checked on the client terminal device 2 as well. In other words, the client can check the content of the translation file and can perform correction or the like on the translation file via the client terminal device 2 (Step S32). In the case of machine translation, translation by the machine translation tool 17 is performed in Step S24 instead of making a request for a translation to the crowdsourcing human translation 4. The information providing device 1 links this translation to the two-dimensional code character string assigned to the original document of the translation, and saves the translation in the document DB 110 as a translation file in Step S30. The registration of a document and the creation of a translation are conducted in this manner.

<Another Mode of Document Registration>

In the example described above, the document 5 is uploaded via the screens of FIGS. 8 to 12 from the information providing device 1. In this mode, on the other hand, the client terminal device 2 takes the lead in executing these processing steps. The client terminal device 2 in this case runs a program for uploading the documents (hereinafter referred to as "upload program"), to thereby implement the quotation processing unit 14. Document creation software such as general-purpose word processor software is installed in the client terminal device 2, and the upload program is desirably incorporated in this software.

Figure 14:
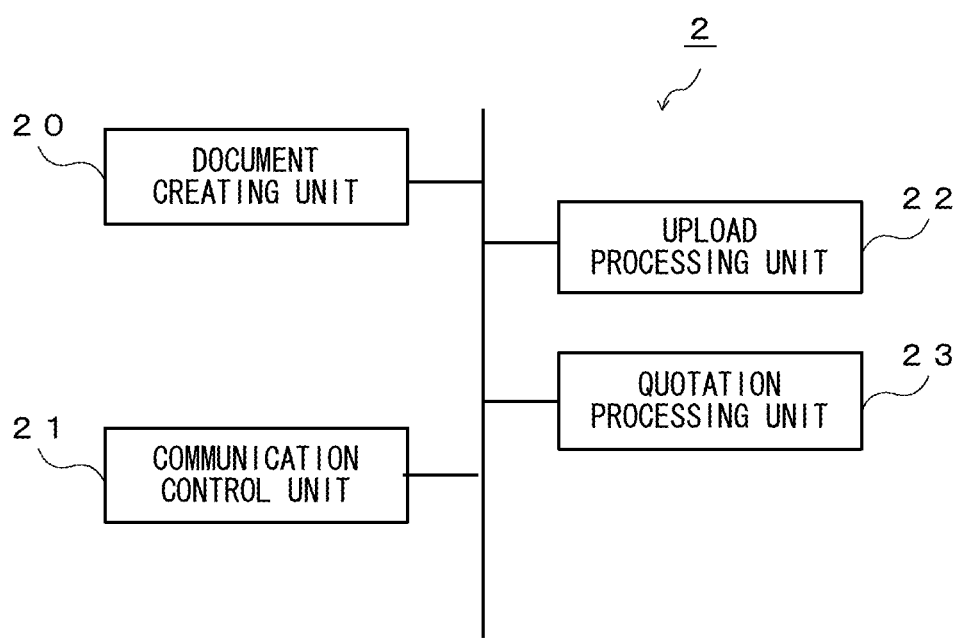
FIG. 14 is a configuration diagram of a client terminal device.

FIG. 14 is a configuration diagram of this client terminal device 2. The client terminal device 2 includes a document creating unit 20 for creating a document which is implemented by activating the document creation software, a communication control unit 21 for holding communication to/from the information providing device 1 over the network N, an upload processing unit 22, which is implemented by executing the upload program, and a quotation processing unit 23.

Figure 15:
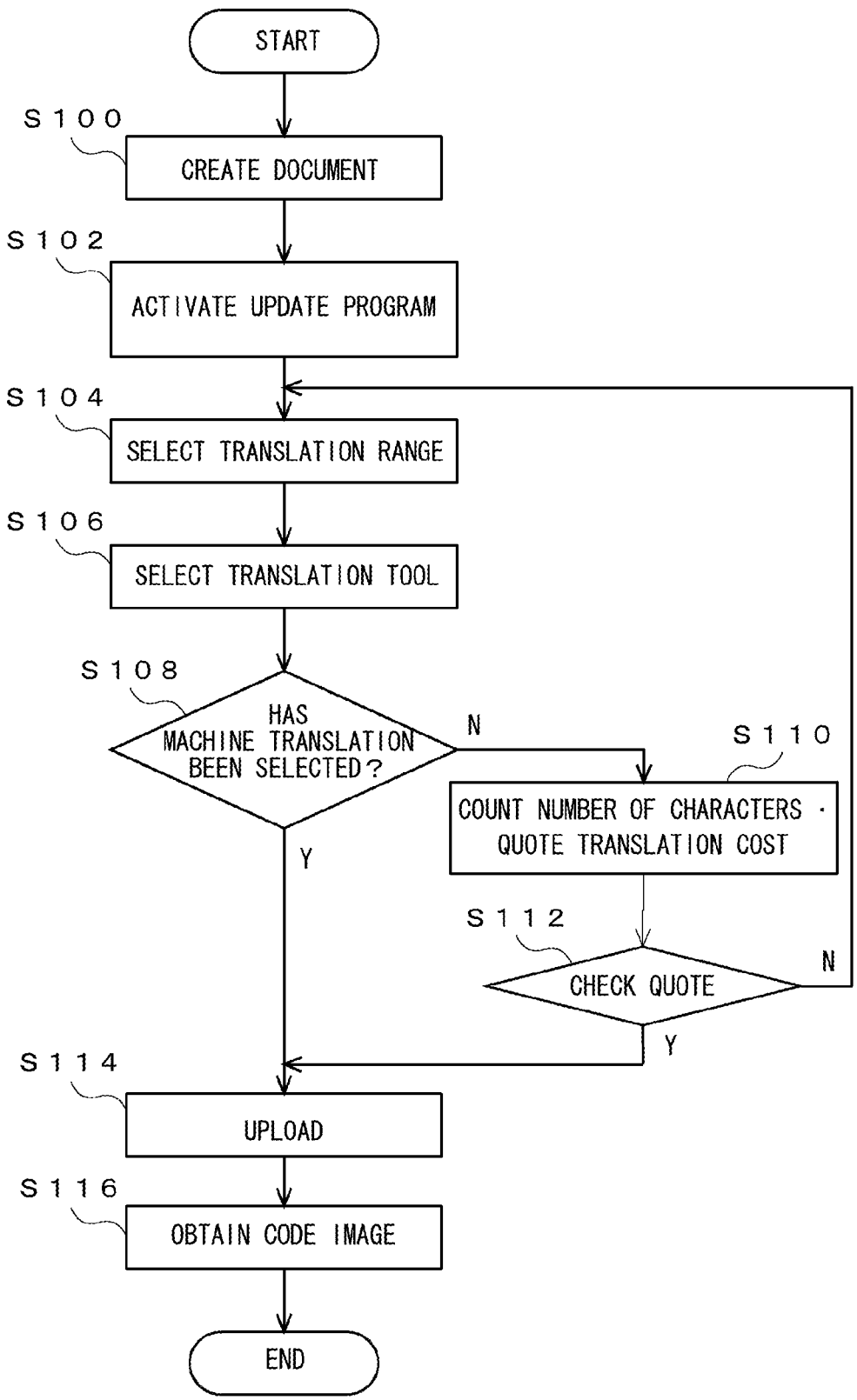
FIG. 15 is a procedure diagram of processing that is executed by the client terminal device to upload a document.

FIG. 15 is a procedure diagram of processing for uploading the document 5 from the client terminal device 2.

The client creates a document with the document creating unit 20 which is implemented by the client terminal device 2 by activating document creation software (Step S100). ID information registered to the document creation software as a user may be associated with a login ID and password for logging into the information providing device 1.

While the document creation software is active, the upload program is activated to implement the upload processing unit 22, and a document can now be uploaded (Step S102).

The upload processing unit 22 prompts the client to select a translation target range from a document on an activation screen of the document creating unit 20 (Step S104). The client selects the translation target range from the document on the screen. The whole document may be selected as the target of translation.

After the translation target range is selected, the upload processing unit 22 displays, for example, the screen of FIG. 12 to prompt the client to select a translation tool (Step S106). A document posting situation, a document posting place, a document posting period, a language into which the document is translated, and the like are also input while Steps S104 to S106 are executed. The client terminal device 2 displays screens exemplified in FIGS. 9 to 12 in order to prompt the input of these.

In the case where translation performed by a person such as crowdsourcing human translation is selected, the client terminal device 2 uses the quotation processing unit 23 to quote translation cost by counting the number of characters in the translation target range of the document (Step S108: N, S110). The result of the quotation is displayed on the screen to be checked by the client (Step S112). If the client does not approve the result of the quotation, the client terminal device 2 returns to the translation range selecting screen to prompt the client to select a translation range anew (Step S112: N, S104). In the case where the client approves the result of the quotation, the client terminal device 2 uses the upload processing unit 22 to upload the document that is the translation target to the information providing device 1 via the communication control unit 21, and also notifies the information providing device 1 of the document posting situation, the document posting place, the document posting period, the tool used for translation, the language into which the document is translated, and the like (Step S112: Y, S114). The upload program may be ended upon instruction from the client in the case where the client does not approve the result of the quotation.

When the translation tool selected in Step S106 is machine translation, the client terminal device 2 uses the upload processing unit 22 to immediately upload the document that is the translation target to the information providing device 1 via the communication control unit 21, and also notifies the information providing device 1 of the document posting situation, the document posting place, the document posting period, the tool used for translation, the language into which the document is translated, and the like (Step S108: Y, S114).

After the uploading, the information providing device 1 executes Step S22 of FIG. 6. The client terminal device 2 obtains from the information providing device 1 the code image 50 that is relevant to the uploaded document (Step S116). A document is uploaded in this manner. Thereafter, Steps S30 and S32 of FIG. 6 are executed to finish up the document registration and translation creation.

<Displaying a Translation File and Others>

Figure 16:
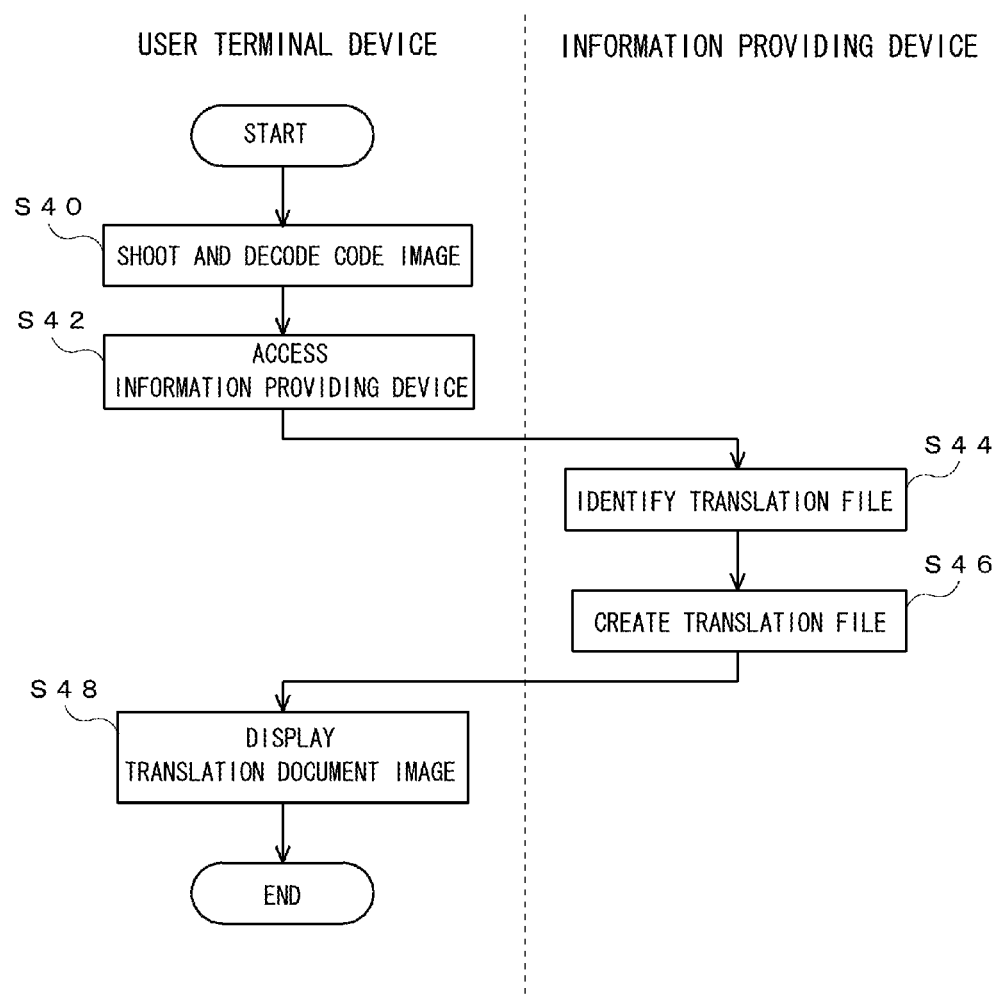
FIG. 16 is a procedure diagram of processing that is executed by a user terminal device to obtain a translation.

FIG. 16 is a procedure diagram of processing that is executed when the user terminal device 3 accesses a translation file and the user reads the content of the translation.

Figure 17:
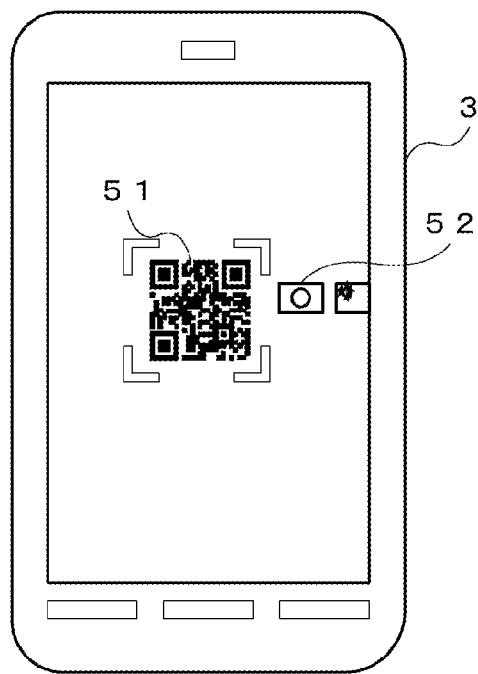
FIG. 17 is a diagram exemplifying a code image that is taken into the user terminal device.

The user goes out to a place where the document 5 is posted and reads the code image 50 of the document 5 with the use of the camera function that the user terminal device 3 is equipped with. The user terminal device 3 decodes the two-dimensional code 51 of the code image 50, and accesses a translation file saved in the information providing device 1 that is identified by the two-dimensional code (Steps S40 and S42). A cellular phone or a smartphone has character code data recorded therein which indicates a language set to its own device by default. When accessing the information providing device 1, the user terminal device 3 sends this character code data as well by default. The user terminal device 3 displays the code image 50 taken in with the camera as illustrated in FIG. 17.

The information providing device 1 first identifies a translation file that is in a language indicated by the character code data sent from the user terminal device 3 (Step S44), and generates a translation document image from the identified translation file (Step S46). The generated translation document image is sent to the user terminal device 3 along with location information which visualizes the posting place of the original document 5 of this translation file. The visualized location information shows a geographical section, the location of a building in a section, the location of a floor in a building, or the like on a simplified map.

Figure 18:
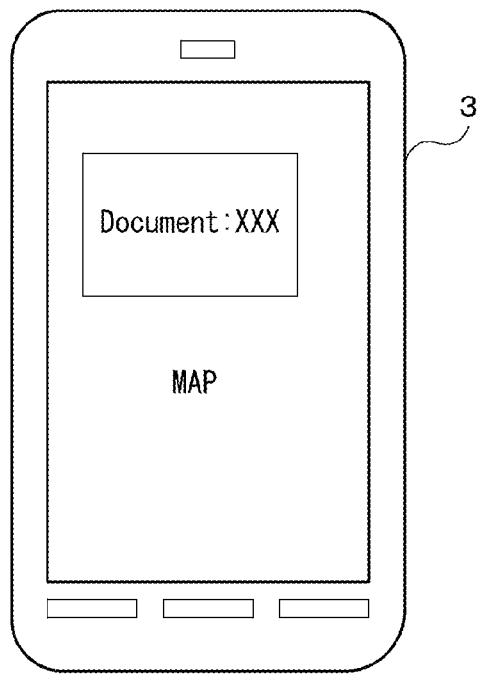
FIG. 18 is a diagram illustrating what is displayed on the user terminal device.
Figure 19:
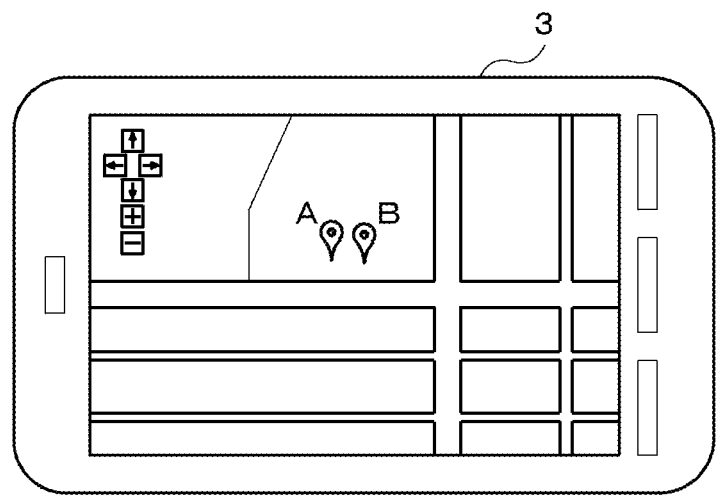
FIG. 19 is a diagram exemplifying a map of a posting place.

The user terminal device 3 displays the simplified map of the posting place of the document 5 which has been sent from the information providing device 1 (FIG. 18). If the displayed place is the same as a place where the user is, the received translation document image is guaranteed to be an image of a translation of the original document 5. In the case of a user whose grasp of his/her own current location is not solid, such as a tourist, displaying a map of the posting place does not clarify whether it is a correct place or not for the user. The current location of the user may therefore be displayed in a superimposed manner on a map of the posting place. FIG. 19 is a diagram exemplifying a case where the current location of the user terminal device 3 is displayed in a superimposed manner on a map of the posting place. A portable information terminal device used as the user terminal device 3 such as a cellular phone or a smartphone often includes a function of identifying the current location of the user terminal device 3 such as Global Positioning System (GPS) as a standard function. The current location of the user is easily tracked owing to this function, and can be displayed in a superimposed manner on a map of the posting place.

Figure 20:
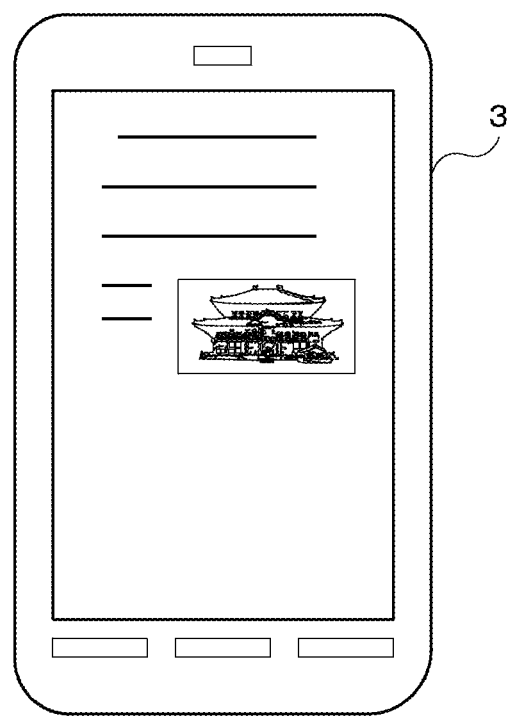
FIG. 20 is a diagram illustrating what is displayed when a translation document image is displayed.

After the user checks the posting place on the simplified map, the user terminal device 3 displays the translation document image of the translation file (Step S48). FIG. 20 is a diagram exemplifying the translation document image. The translation document image has the same layout as that of the original document 5. Accordingly, a comparison between the translation document image and the document 5 from which the code image 50 has been read proves that the translation document image is an image of a translation of the original document 5. The user can thus confirm that the translation document image is an image of a translation of the original document from the map and the translation image document.

In the case where the user wishes to read a translation in another language, the user only needs to select the desired language from among the language codes 52 of the code image 50.

Figure 21:
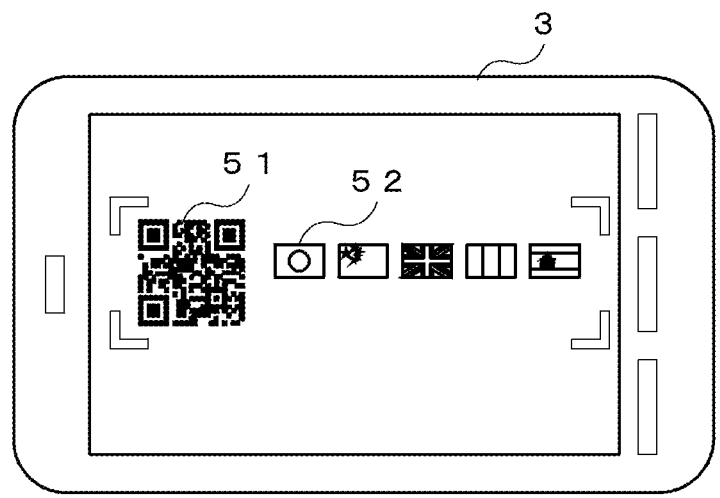
FIG. 21 is a diagram illustrating what is displayed on a translation language selecting screen.

For instance, by taking in the two-dimensional code 51 and the language codes 52 in advance as illustrated in FIG. 21 and selecting a desired language code, the user can access a translation file that has the same two-dimensional code character string as that of a translation file accessed with the use of the two-dimensional code 51 and that is in a language indicated by the selected language code 52. The specifics of the selection made by selecting that particular language code 52 are transmitted from the user terminal device 3 to the information providing device 1. The information providing device 1 identifies a translation file from the specifics of the selection, generates a translation document image, and displays the translation document image on a display device of the user terminal device 3. With the translation document image displayed on the user terminal device 3, the user can read the document in a desired language.

Figure 22:
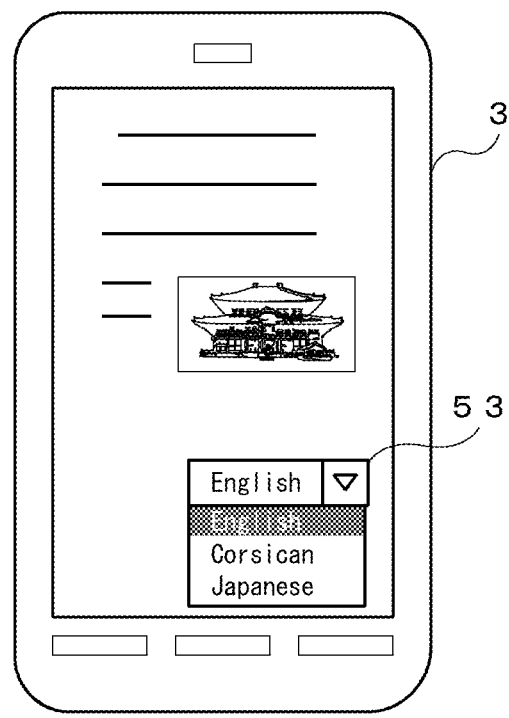
FIG. 22 is a diagram illustrating what is displayed when a translation document image with a language selection button is displayed.

Alternatively, a desired language may be selected with the use of, for example, a language selection button 53 which is displayed at a given point in the translation document image as illustrated in FIG. 22.

Reading the translated part with a voice may be added to a visible translation document which is provided to the user in this embodiment. In this case, an audio file of a translation is saved in association with a translation file of the translation in the document DB 110 or another database. A reproduction code image for reading the audio file is added to the translation document image such as the image of FIG. 20, and the audio file is played when the user selects the reproduction code image.

As described above, saving a translation of a document that is input from the client terminal device 2 in the information providing device 1 for a fixed period of time allows the user terminal device 3 to display the translation or to download the translation as the need arises.

In addition, the information providing device 1 issues the code image 50 for accessing the document and the translation to the client via the client terminal device 2, and the client prints/attaches the code image 50 on/to the document, which enables the user to access the translation with ease and, moreover, to check the visualized posting place while accessing. The user can thus easily confirm the genuineness of the translation.

The example given in this embodiment is of a case where the code image 50 that includes the two-dimensional code 51 and the language codes 52 is generated in advance and transmitted to the client terminal device 2. The code image 50 may instead include only the character string or image indicating a URL which is described above, whereas the language codes 52 indicating languages translation into which has been finished are displayed on the display device of the user terminal device 3 when the user accesses via the code image 50 so that the user can choose from. Alternatively, the language codes 52 may be displayed in a display mode that discriminates the language codes 52 indicating languages translation into which has been finished from the language codes 52 indicating languages translation into which has not been finished.

REFERENCE SIGNS LIST

1 . . . information providing device, 10 . . . client management unit, 100 . . . client DB, 11 . . . document management unit, 110 . . . document DB, 12 . . . communication control unit, 13 . . . code image issuing unit, 14 . . . quotation processing unit, 15 . . . translation document image generating unit, 16 . . . main control unit, 17 . . . machine translation tool, 2 . . . client terminal device, 20 . . . document creating unit, 21 . . . communication control unit, 22 . . . upload processing unit, 23 . . . quotation processing unit, 3 . . . user terminal device, 4 . . . crowdsourcing human translation, 5 . . . document, 50 . . . code image, 51 . . . two-dimensional code, 52 . . . language code, 53 . . . language selection button, N . . . network

The invention claimed is:

1. An information providing device, comprising:
a document saving unit configured to save an electronic document that is representative of a physical document posted in a given geographic posting place and to save respective electronic files for one or more translations of the electronic document in one or more other languages, in association with one another by way of document identification information for the electronic document;
a recording unit configured to record a character string for identifying: (i) each of the electronic files, and (ii) location information for allowing visual recognition of the given geographic posting place of the physical document;
a code image issuing unit configured to issue a code image including a character string image obtained by encoding the character string, where the code image is provided in proximity to the physical document at the given geographic posting place; and
a control unit configured to:
receive character code data from a terminal device of a user, where the character code data includes: (i) an indication of the character string decoded from the code image provided in proximity to the physical document, and (ii) an indication of a particular language selected by the user,
extract from the document saving unit one of the electronic files containing one of the one or more translations in the particular language selected by the user that is indicated by the character code data,
extract from the recording unit the location information that indicates the given geographical posting place of the physical document, and
transmit the one of the electronic files and the location information to the terminal device so that the one of the electronic files and the location information are displayed on a display of the terminal device and the user may view the particular translation and be provided with a visual indication of the given geographic posting place of the physical document.

2. The information providing device according to claim 1, further comprising a translation document generating unit configured to detect a layout of the physical document prior to translation, and to edit the translation in the particular language indicated by the character code data to give the electronic file of the translation the same layout, wherein a content of the electronic file is transmitted to the terminal device.

3. The information providing device according to claim 1, wherein:
the code image issuing unit generates the code image by combining the character string image with encoded language images, which indicate languages into which the electronic document associated with the electronic file that is identified by the character string is translated, and
one of the encoded language images is selected so that the electronic file of the translation in the language of the selected one of the encoded language images is selectable.

4. The information providing device according to claim 1, further comprising:
an interface for connecting to crowdsourcing human translation; and a quotation processing unit configured to execute processing of quoting cost of translating the posted document in a list of translation languages by the crowdsourcing human translation.

5. The information providing device according to claim 4, further comprising:
a machine translation unit configured to translate the electronic document into another language by machine translation and to generate an electronic file of the resultant translation,
wherein one of the crowdsourcing human translation and the machine translation is selectable, and
wherein the code image issuing unit includes, in the code image, an image indicating whether the translation has been performed by the crowdsourcing human translation or by the machine translation.

6. The information providing device according to claim 1, further comprising:
an audio file saving unit configured to save the electronic file of the translation in association with an audio file that represents audio of the translation,
wherein the control unit transmits the electronic file such that the electronic file is displayed on the display device of the terminal device along with a reproduction code image for playing the audio file that is associated with the electronic file.

7. An upload device for uploading, to the information providing device according to claim 1, the electronic document and the location information, the upload device comprising:
a communication control unit configured to carry out communication to/from the information providing device;
a document creating unit configured to create the electronic document representing the physical document to be posted; and
a upload processing unit, which is incorporated in the document creating unit, for uploading the electronic document and the location information to the information providing device via the communication control unit.

8. A terminal device for obtaining, from the information providing device according to claim 1, one of the electronic files and the location information and displaying the obtained electronic file and location information on a display device comprised in the terminal device, the terminal device comprising location identifying unit configured to identify a current location of the terminal device,
wherein, when the location information is displayed, the current location of the terminal device identified by the location identifying unit is displayed in a superimposed manner.

9. An information providing method, comprising:
saving an electronic document that is representative of a physical document posted in a given geographic posting place;
saving respective electronic files for one or more translations of the electronic document in one or more other languages, in association with one another by way of document identification information for the electronic document;
recording a character string for identifying: (i) each of the electronic files, and (ii) location information for allowing visual recognition of the given geographic posting place of the physical document;
issuing a code image including a character string image obtained by encoding the character string, where the code image is provided in proximity to the physical document at the given geographic posting place;
receiving character code data from a terminal device of a user, where the character code data includes: (i) an indication of the character string decoded from the code image provided in proximity to the physical document, and (ii) an indication of a particular language selected by the user;
extracting one of the electronic files containing one of the one or more translations in the particular language selected by the user that is indicated by the character code data,
extracting the location information that indicates the given geographical posting place of the physical document; and
transmitting the one of the electronic files and the location information to the terminal device so that the one of the electronic files and the location information are displayed on a display of the terminal device and the user may view the particular translation and be provided with a visual indication of the given geographic posting place of the physical document.

10. A non-transitory, computer readable recording medium containing a computer program for causing a computer to function as an information providing device, comprising:
a document saving unit configured to save an electronic document that is representative of a physical document posted in a given geographic posting place and to save respective electronic files for one or more translations of the electronic document in one or more other languages, in association with one another by way of document identification information for the electronic document;
a recording unit configured to record a character string for identifying: (i) each of the electronic files, and (ii) location information for allowing visual recognition of the given geographic posting place of the physical document,
a code image issuing unit configured to issue a code image including a character string image obtained by encoding the character string, where the code image is provided in proximity to the physical document at the given geographic posting place; and
a control unit configured to:
receive character code data from a terminal device of a user, where the character code data includes: (i) an indication of the character string decoded from the code image provided in proximity to the physical document, and (ii) an indication of a particular language selected by the user,
extract from the document saving unit one of the electronic files containing one of the one or more translations in the particular language selected by the user that is indicated by the character code data,
extract from the recording unit the location information that indicates the given geographical posting place of the physical document, and
transmit the one of the electronic files and the location information to the terminal device so that the one of the electronic files and the location information are displayed on a display of the terminal device and the user may view the particular translation and be provided with a visual indication of the given geographic posting place of the physical document.

* * * * *